United States Patent Office 3,340,289
Patented Sept. 5, 1967

---

3,340,289
ORGANOSILICON CYCLICS
Tse C. Wu, Waterford, N.Y., assignor to General
Electric Company, a corporation of New York
No Drawing. Filed Oct. 10, 1966, Ser. No. 585,310
4 Claims. (Cl. 260—448.2)

This application is a continuation-in-part of my copending application Ser. No. 299,153 filed Aug. 1, 1963, and now Patent No. 3,297,632 and assigned to the same assignee as the present invention. This invention relates to certain cyclic siloxanes. More particularly, the invention relates to organosilicon cyclics which can be employed to make organosilicon polymers having good mechanical strength and other desirable physical properties.

While polysiloxanes consisting of flexible, straight chain siloxane units have been found to be useful in many applications, they have been found to be lacking in desired mechanical strength, particularly at elevated temperatures. It would thus be desirable to provide polysiloxanes having cyclic siloxane units of the formula,

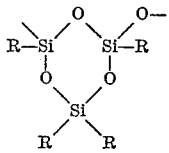

where R is a monovalent hydrocarbon radical to provide decreased flexibility and hence increased strength and enhanced physical properties, particularly at elevated temperatures.

It has been found that cyclic siloxanes of the formula, (1)
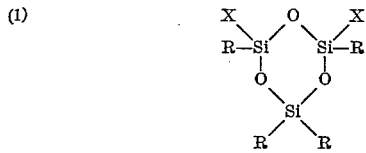

where R is as defined above, and X is selected from a hydroxy radical and halogen radical can provide for such polysiloxanes having the above-described chemically combined units. In addition, methods for making such polysiloxanes are described in my above-mentioned copending application.

Radicals included by R of the above formulae are for example, alkyl radicals such as methyl, ethyl, propyl, butyl, etc.; alkenyl radicals such as vinyl, allyl, cyclohexenyl, etc.; aryl radicals such as phenyl, tolyl, xlyl, etc. radicals; aralkyl radicals such as benzyl, phenylethyl, etc. radicals. R in the above formulae can be all the same radical or a mixture of the aforementioned radicals, and is preferably aryl.

In order that those skilled in the art will be better able to practice the invention, the following examples are given by way of illustration and not by way of limitation. All parts are by weight.

Example 1

Phenyltrichlorosilane was partially hydrolyzed to produce 1,3 - diphenyl - 1,1,3,3 - tetrachlorodisiloxane, the method used being similar to that of Burkhard, as set forth in J. Am. Chem. Soc. 67, 2173 (1945). Next, 92.1 parts of the disiloxane prepared above, were mixed with 350 parts of anhydrous ethyl ether and 40 parts of pyridine as an acid acceptor. The mixture was then added to a solution containing 54.1 parts of diphenylsilanediol, 350 parts of anhydrous ethyl ether, and 90 parts of anhydrous tetrahydrofuran over a period of 2 hours at room temperature. After the reaction mixture had been allowed to stand for 16 hours at room temperature pyridine hydrochloride was removed by filtration. An oily residue was obtained by stripping. It was purified by molecular distillation. The infrared spectrum of a fraction collected at 200° C. and 2×10$^{-5}$ mm. established the identity of 2,4 - dichlorotetraphenylcyclotrisiloxane having the formula

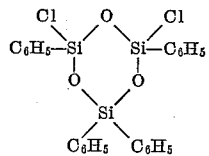

Example 2

A solution of 10 parts of the cyclic trisiloxane of Example 1 in 35 parts of ethyl ether, was added dropwise to a suspension of 10 parts of sodium bicarbonate in 70 parts of ethyl ether, which had been saturated with water. Carbon dioxide gas was evolved during the addition. The reaction mixture was stirred at room temperature for 5 hours and then filtered by suction; the filtrate was stripped. There was obtained 4.7 parts of a clear, solid residue which was soluble in acetone, ethyl acetate and carbon tetrachloride. Its infrared spectrum showed the presence of hydroxy bands at 2.75 microns and 9.95 microns, as well as the cyclic trimer band of 9.75 micron band. Based on its method of preparation and its infrared spectrum, the product had the formula,

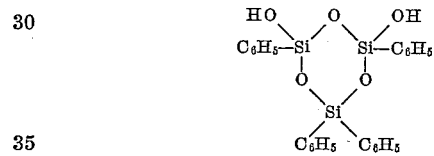

A solution of 2 parts of the above hydroxyl cyclic in 45 parts of toluene was distilled slowly to dehydrate the compound. Water was removed as a toluene-water azeotrope. The infrared spectrum of the resulting residue showed a hydroxyl free polymer having chemically combined cyclic trimer units. The product was a polymer of the formula,

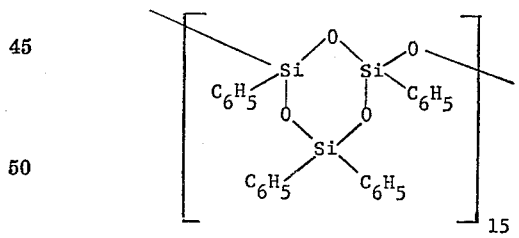

The above material was tack-free below about 80° C., and fluid at a temperature of about 120° C. It was rather brittle at room temperature. Its electrical properties were found to be equivalent to polystyrene or a phenolic resin.

Example 3

There were added simultaneously to a uniform mixture of 15 parts of pyridine and about 400 parts of toluene with stirring, a first solution consisting of 30.8 parts of methyl phenylsilanediol in toluene, and a second solution of 73.6 parts of 1,3-diphenyl-1,1,3,3-tetrachlorodisiloxane in toluene. An additional 24 parts of pyridine was utilized in the second solution. The addition of both solutions to the stirred mixture of pyridine in toluene was completed in about 45 minutes. The resulting mixture was stirred for an additional 2 hours at room temperature and filtered.

There was obtained 21.6 parts of a liquid boiling at 136–137° C. at 0.1 millimeter. Infrared showed that the product had a strong absorption band at 9.85 microns establishing the presence of cyclic trimer units. Elemental analysis for hydrolyzable chlorine showed 15.64 to 15.7 percent. Based on these results, the product was

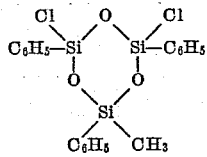

having a theoretical of 15.78 weight percent chlorine.

While the foregoing examples have of necessity been limited to only a few of the very many variables within the scope of the present invention, it should be understood that the present invention covers a much broader class of organosilicon cyclics as shown by Formula 1.

What I claim as new and desire to secure by Letters Patent of the United States is:

1. Organosilicon cyclics of the formula,

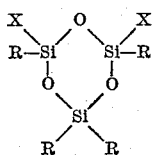

where R is a monovalent hydrocarbon radical selected from the group consisting of alkyl, alkaryl, aryl, and aralkyl radicals, or mixtures of the aforementioned, and X is selected from a hydroxy radical and a halogen radical.

2. An organosilicon cyclic in accordance with claim 1, having the formula,

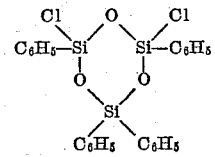

3. An organosilicon cyclic in accordance with claim 1, having the formula,

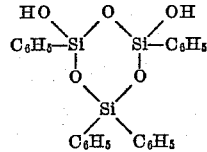

4. An organosilicon cyclic in accordance with claim 1, having the formula,

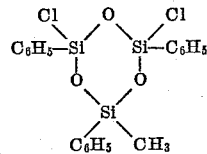

References Cited

UNITED STATES PATENTS 2,904,481   6/1955   Lawton et al. _____ 260—448.2

OTHER REFERENCES

Sokolov et al., Zhurnal Obshchei Khimii, 26, 2276 (1956).

Young et al., J. A. C. S., 70, 3758 (1948).

TOBIAS E. LEVOW, *Primary Examiner.*

P. F. SHAVER, *Assistant Examiner.*